Nov. 15, 1938.   C. W. SINCLAIR   2,136,472
BRAKE DRUM COOLING CONSTRUCTION
Filed Sept. 14, 1936
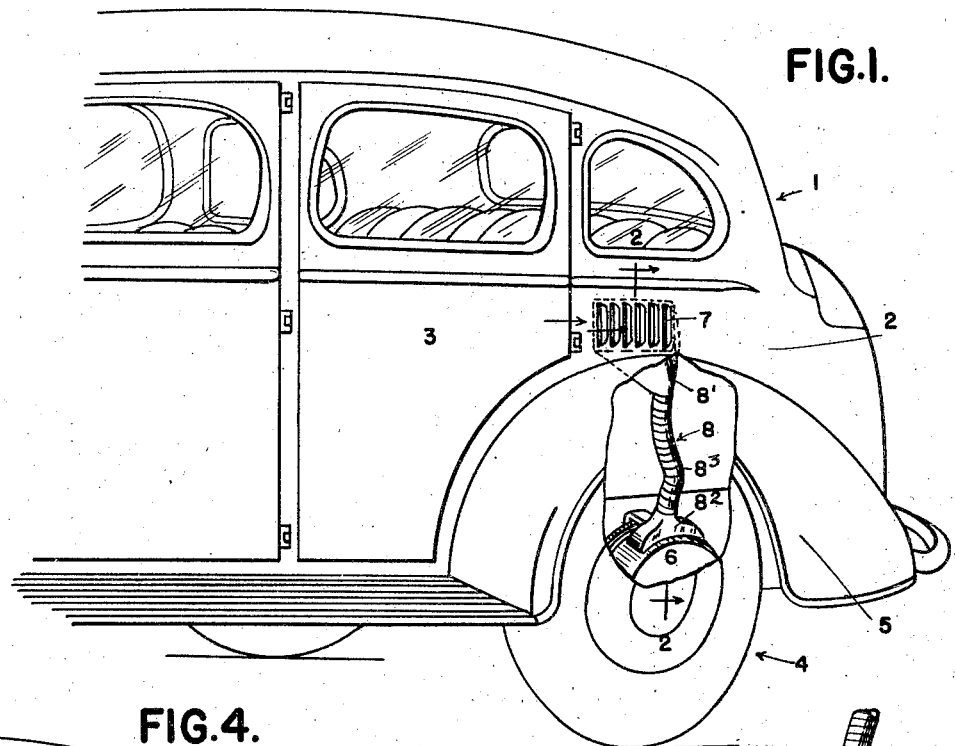
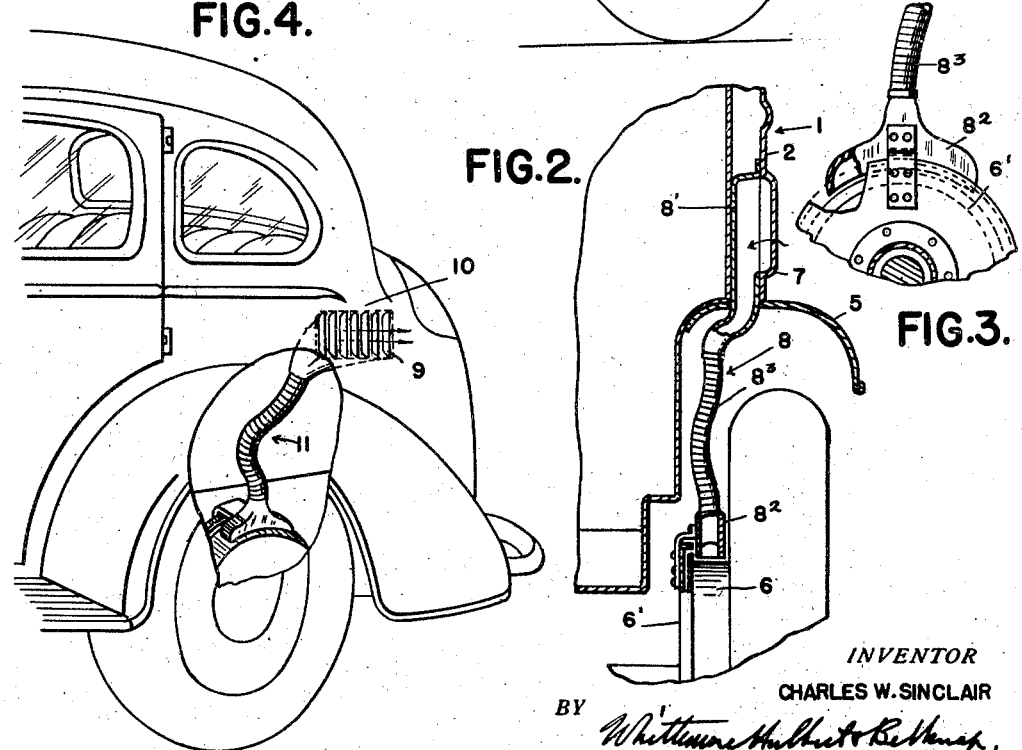
INVENTOR
CHARLES W. SINCLAIR
BY
ATTORNEYS Patented Nov. 15, 1938

2,136,472

UNITED STATES PATENT OFFICE 2,136,472

BRAKE DRUM COOLING CONSTRUCTION

Charles W. Sinclair, Detroit, Mich., assignor to Kelsey-Hayes Wheel Company, Detroit, Mich., a corporation of Delaware Application September 14, 1936, Serial No. 100,783

8 Claims. (Cl. 188—264)

The invention relates to brake drum cooling constructions and refers more particularly to constructions for cooling brake drums of motor vehicles of the passenger type.

One of the objects of the invention is to make use of the motor vehicle body and of movement of the motor vehicle to effect the cooling. Other objects are to provide the body with louvre means for creating movement of air past a brake drum and to locate the louvre means where it will not be affected by other parts of the motor vehicle, such as fenders and the like.

These and other objects will become apparent from the following description, taken in connection with the accompanying drawing, in which Figure 1 is a perspective view, partly broken away, of a portion of the motor vehicle having applied thereto a brake drum cooling construction embodying my invention;

Figure 2 is a cross section on the line 2—2 of Figure 1;

Figure 3 is an inside elevation, partly broken away, of the cooling construction in the zone of the brake drum;

Figure 4 is a view similar to Figure 1 showing another embodiment of my invention.

With the present construction of motor vehicles of the passenger type and more particularly of the pleasure type the brake drums for the rear wheels are so shielded from air that it is very difficult to maintain these brake drums cool. With my invention use is made of the motor vehicle body for effecting cooling of the brake drums. As shown in Figures 1 and 2, 1 is a motor vehicle body of the closed passenger type having the fixed rear quarter portions or panels 2 and the rear doors 3. This body is carried in the usual manner upon front and rear wheels, the latter being designated as at 4. 5 are the rear fenders. 6 are the brake drums for the rear wheels. The construction of both the rear wheels and the brake drums may be any usual construction.

For the purpose of effecting the cooling of the brake drums 6, I have provided the louvres 7 on the motor vehicle body and more particularly on the rear quarter portions or panels 2 above the fenders 5 and substantially above the brake drums. These louvres face or open in a forward direction to collect air during the forward movement of the motor vehicle and direct this air into the conduits 8 which are carried by the rear quarter portions or panels and extend adjacent to the brake drums. The conduits 8 have the upper inlet portions 8' fixed to the body, the lower outlet portions 8² fixedly carried by the backing plates 6' for the brake drums, and the flexible portions 8³ connecting the inlet and outlet portions and providing for relative movement of the body and brake drums when the motor vehicle is in use.

In the modification shown in Figure 4, the louvres 9 are located on the rear quarter portions or panels 10 above the fenders and also above and preferably slightly in rear of the brake drums. These louvres open or face in a rearward direction so that upon forward movement of the motor vehicle air is drawn outwardly through the louvres. 11 are conduits extending from the louvres to adjacent the brake drums and constructed in substantially the same manner as the conduits 8.

From the above description, it will be readily seen that the louvres for creating movement of air past the brake drums are mounted upon the motor vehicle body and more particularly a stationary portion or panel thereof in a position such that other parts of the motor vehicle, such as the fenders and the like, will not interfere with the proper operation of the louvres to either collect air or create a vacuum effect for withdrawing air.

What I claim as my invention is:

1. In a construction for cooling a brake drum of a motor vehicle, the combination with a motor vehicle body, means including a wheel for carrying said body and a brake drum for said wheel, of means dependent upon movement of the motor vehicle for creating movement of air past said brake drum, said means comprising a louvre upon said body and a conduit extending from said louvre to adjacent said brake drum.

2. In a construction for cooling a brake drum of a motor vehicle, the combination with a motor vehicle body, means including a wheel for carrying said body and a brake drum for said wheel, of means dependent upon movement of the motor vehicle for creating movement of air past said brake drum, said means comprising a louvre upon said body facing in a forward direction.

3. In a construction for cooling a brake drum of a motor vehicle, the combination with a motor vehicle body, means including a wheel for carrying said body and a brake drum for said wheel, of means dependent upon movement of the motor vehicle for creating movement of air past said brake drum, said means comprising a louvre upon said body facing in a rearward direction.

4. In a construction for cooling a brake drum of a motor vehicle, the combination with a motor vehicle body having a fixed portion and a door hinged thereto, means including a wheel for carrying said body and a brake drum for said wheel, of means dependent upon movement of the motor vehicle for creating movement of air past said brake drum, said means comprising a louvre upon said fixed portion and a conduit extending from said louvre to adjacent said brake drum.

5. In a construction for cooling a brake drum of a motor vehicle, the combination with a motor vehicle body, means including a wheel for carrying said body, a brake drum for said wheel and a backing plate, of a louvre upon said body and a conduit extending from said louvre to adjacent said brake drum, said conduit having a portion fixed upon said body in communication with said louvre, a portion fixed upon said backing plate having an opening adjacent to said brake drum, and an intermediate portion providing for relative movement of said body and wheel.

6. In a construction for cooling a brake drum of a motor vehicle, the combination with a motor vehicle body, means including a wheel for carrying said body, a brake drum for said wheel and a backing plate, of means dependent upon movement of the motor vehicle for creating movement of air past said brake drum, said means comprising a louvre upon said body, and a conduit extending from said louvre to adjacent said brake drum, said conduit having a portion fixed to said body in communication with said louvre, a portion fixed upon said backing plate having an opening adjacent said brake drum, and a flexible intermediate portion.

7. In a construction for cooling a brake drum of a motor vehicle, the combination with a motor vehicle body having a generally vertical side panel extending longitudinally of the motor vehicle, means including a wheel for carrying said body and a brake drum for said wheel, of means upon said panel and dependent upon movement of the motor vehicle for creating movement of air past said brake drum.

8. In a construction for cooling a brake drum of a motor vehicle, the combination with a motor vehicle body having a side panel, means including a wheel for carrying said body and a brake drum for said wheel, of a conduit extending from adjacent the inner side of said panel to adjacent said brake drum, said panel having an opening therein arranged to collect air for passage through said conduit to adjacent said brake drum.

CHARLES W. SINCLAIR.